United States Patent [19]
Strandberg

[11] Patent Number: 5,896,124
[45] Date of Patent: Apr. 20, 1999

[54] CLEANING TRACKBALL FOR A COMPUTER POINTING DEVICE

[76] Inventor: Arthur E. Strandberg, Mariestadsvagen 17, S-121 50 Johanneshov, Sweden

[21] Appl. No.: 08/518,672

[22] Filed: Aug. 24, 1995

[30]  Foreign Application Priority Data

Mar. 22, 1995 [SE] Sweden .................................. 9501023

[51] Int. Cl.[6] ........................................... G09G 5/08
[52] U.S. Cl. ........................................ 345/163; 345/167
[58] Field of Search .......................... 345/156, 163, 345/164, 167, 161, 184; 74/471 XY; 273/148 B; 134/8, 9; 15/210.1, 104.93, 104.92, 1; 463/37, 38

[56]  References Cited

U.S. PATENT DOCUMENTS

| | | | |
|---|---|---|---|
| 4,673,440 | 6/1987 | Chaplin | 134/8 |
| 4,760,618 | 8/1988 | Chapin, Jr. | 15/210.1 |
| 4,797,665 | 1/1989 | Ida et al. | 345/164 |
| 4,951,034 | 8/1990 | Mazzone et al. | 345/164 |
| 5,214,415 | 5/1993 | Pandolei | 345/164 |
| 5,486,845 | 1/1996 | Chait | 345/163 |

FOREIGN PATENT DOCUMENTS

| | | | |
|---|---|---|---|
| 60-55430 | 3/1985 | Japan | 345/163 |
| 2268049 | 1/1994 | United Kingdom . | |

*Primary Examiner*—Chanh Nguyen
*Attorney, Agent, or Firm*—Jones, Day, Reavis & Pogue

[57]  ABSTRACT

The invention consists of a trackball (16) for a computer pointing device (10) with a layer of fabric (20, 50) hot-pressed onto the trackball (16). The trackball of the present invention cleans the internal parts of the computer pointing device, in particular the direction sensors (30, 32) of the device. The trackball (16) can be placed permanently in the computer pointing device (10) where it simultaneously cleans and actuates the direction sensors (30, 32) in the normal manner.

18 Claims, 2 Drawing Sheets

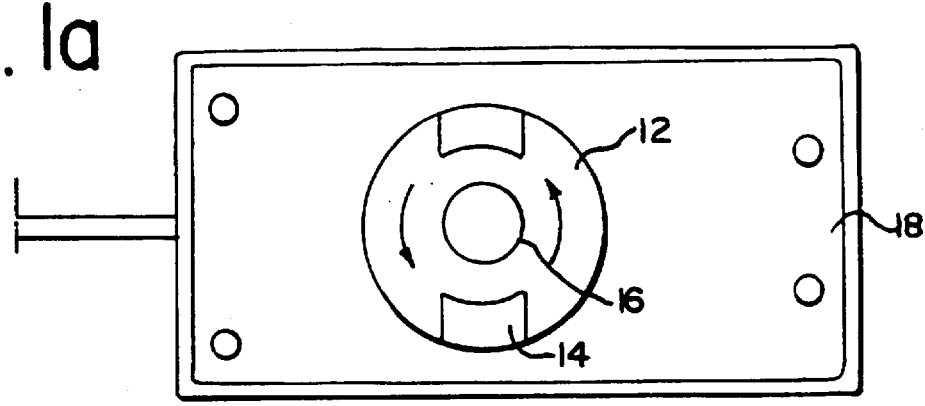
FIG. 1a
FIG. 1b
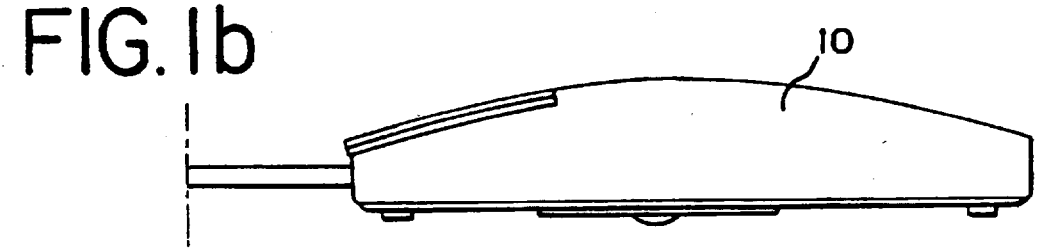
FIG. 2
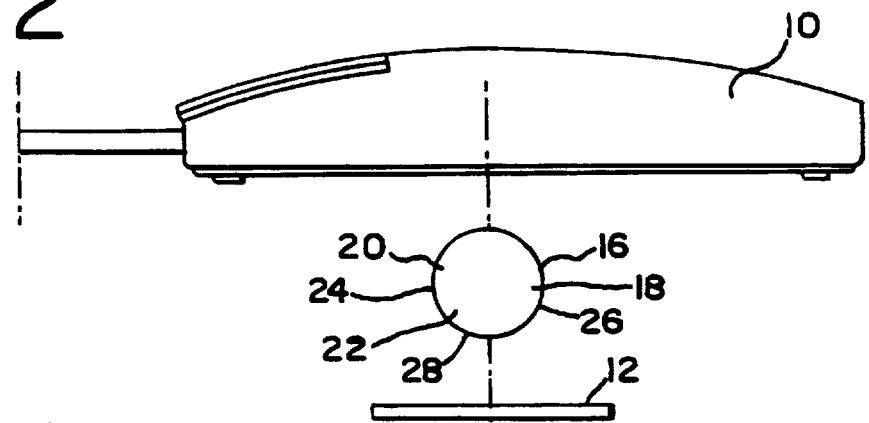
FIG. 3
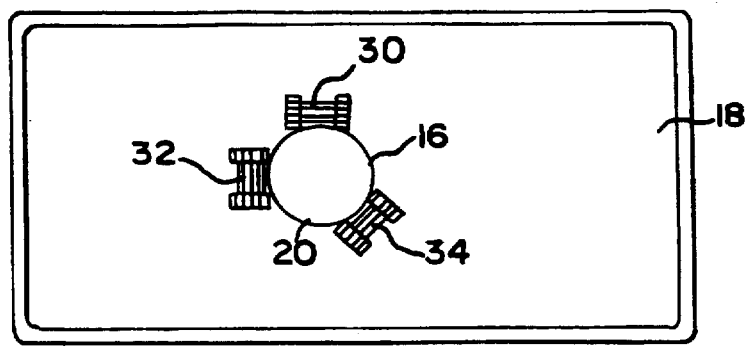

5,896,124

CLEANING TRACKBALL FOR A COMPUTER POINTING DEVICE

FIELD OF THE INVENTION

The present invention relates to trackballs for controlling the direction sensors of a computer pointing device. More specifically, the invention relates to trackballs which can be installed temporarily or permanently to provide a cleaning effect while engaging the direction sensors.

BACKGROUND OF THE INVENTION

Computer pointing devices include movable computer mouses commonly used with a portable computers and stationary trackball devices commonly used with laptop computers. A trackball is employed in a computer pointing device to engage direction sensors which register directional movement of the trackball. The computer pointing device communicates the registered directional movement to a cursor associated with a computer screen.

During movement, trackballs collect dirt, dirt marks, skin particles and other matter from mouse pads, other underlying surfaces on which computer pointing devices rest, the fingers of the user and other items which contact trackballs. The dirt is eventually transferred from the trackball onto the direction sensors of the computer pointing device. Indeed, conventional trackballs effectively transfer dirt to direction sensors under the same principle that a ball in a ballpoint pen transfers ink to paper.

The direction sensors which are loaded with dirt no longer respond in the intended manner. Depending on the nature of the dirt (e.g., old dirt hardens if it is not removed) and on the design of the sensor, the control signals to the computer may become incorrect.

In conventional circumstances, the user is unaware of the fact that dirt is affecting the pointing device in an adverse manner and contacts service personnel to request correction of a badly functioning computer. Consequently, the user incurs an unnecessary expense which would not occur had the user been aware of the actual cause of the problem.

On the other hand, if the user is aware of the problem with dirt fastening on the computer pointing device, he can, for example, shake the mouse or rub the mouse over an underlying surface in an attempt to loosen the dirt. If this activity does not solve the problem, the dirt must be removed by hand. Thus, in the case of a computer mouse, the user must remove the plate which holds the trackball in place and shake the mouse to loosen the trackball out of the mouse. Correspondingly, in the case of a stationary trackball employed in a laptop computer, the user must remove a locking plate, turn the computer upside down and shake the trackball loose. The user cleans the plate and the trackball by blowing away the dirt or by removing the dirt with a rag or a cotton pad, possibly with the aid of a suitable cleaning solution. In order to clean the direction sensors, the user can use his nails, other thin devices or a cotton pad to remove the dirt. The direction sensors are more inaccessibly placed inside the computer pointing device. Since the direction sensors are often fixed so as to easily rotate around an axis, these sensors tend to rotate as soon as they are touched, making cleaning difficult. The actual cleaning, therefore, may take an appreciable amount of time (e.g., 15–20 minutes is not unusual).

U.S. Pat. No. 4,673,440 to Chapin, Jr. and published British Patent Application GB-A-2,268,049 to Burton teach apparatuses for cleaning trackballs. U.S. Pat. No. 4,673,440 discloses a cleaning ball covered with a VELCRO material which is used together with an underlying surface, also of a VELCRO material, to clean a computer mouse. British Patent Application GB-A-2 268 049 discloses a ball fitted with a stick for cleaning direction sensors in a computer mouse. However, these patents do not disclose a trackball which can temporarily or permanently replace the existing trackball in a computer pointing device to clean the direction sensors.

SUMMARY OF THE INVENTION

An object of the present invention is to provide a trackball for a computer pointing device, such as a computer mouse or a stationary trackball device.

Another object of the present invention is to provide a trackball which controls direction sensors in the computer pointing device and simultaneously cleans dirt which has penetrated into the pointing device and prevents dirt from reaching the interior of the pointing device.

A further object of the present invention is to provide a cleaning trackball which either replaces or supplements the original trackball after which it both cleans and controls the direction sensors of the computer pointing device.

The objects of the present invention are achieved by applying a fabric around a trackball. The fabric may be applied around the trackball such that the outer material of the trackball penetrates into interstitial spaces in the fabric. The trackball of the present invention can temporarily supplement an original trackball by inserting it into the computer pointing device, cleaning the dirt therein, removing the cleaning trackball and replacing it with the original trackball. The trackball of the present invention can also be inserted permanently in the computer pointing device in order to remove dirt and control the direction sensors on a continual basis.

To further increase the cleaning effect, cleaning agents which bind to the fabric or which evaporate from the fabric, can be applied to the trackball.

The fabric can be made of a synthetic material. The trackball can be made of a rubbery material or an equivalent elastic material. Alternatively, the trackball can be hollow or can comprise a core and a mantle which are made of different materials or the same material. The mantle of the trackball can primarily comprise a rubbery material or an equivalent elastic material. The core of the trackball may comprise a solid or hollow ball of plastic or metal.

BRIEF DESCRIPTION OF THE DRAWINGS

To give a better understanding of the present invention and its purposes, reference should be made to the Detailed Description of the Invention together with the enclosed drawings, in which:

FIG. 1a is a bottom view of a computer pointing device with a trackball in accordance with the present invention;

FIG. 1b is a side elevational view of the computer pointing device in FIG. 1a;

FIG. 2 is a side elevational view of a computer pointing device with a disc plate and the trackball removed from the computer pointing device;

FIG. 3 is a schematical view of the trackball situated in the computer pointing device between the two direction sensors and a positioner;

DETAILED DESCRIPTION OF THE INVENTION

Figure 4A:
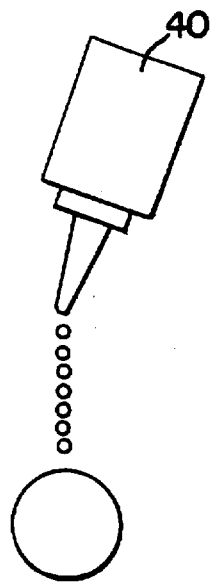
FIG. 4a illustrates the application of cleaning fluid to a trackball removed from a computer pointing device.

The invention comprises a trackball for use in a computer pointing device such as a computer mouse or a stationary trackball device. The present invention will be described principally with respect to a computer mouse for illustrative purposes. However, the invention is equally applicable to any computer pointing device which uses a trackball or an equivalent to register directional movement in a computer.

Primarily, two alternative modes of use exist for the trackball of the present invention. In a first mode, the original trackball in the mouse is temporarily removed and replaced by a cleaning trackball. In accordance with the present invention, the cleaning trackball loosens dirt from the interior of the mouse when the cleaning trackball is rotated by moving the mouse backwards and forwards. Once the dirt has been removed, the cleaning trackball is replaced with the original trackball in the mouse. This procedure can be repeated as required.

In a second mode, the original trackball in a mouse is permanently replaced by a trackball constructed in accordance with the present invention. The trackball fulfills the normal function of the trackball in controlling the direction sensors and the synergetic function of cleaning and preventing dirt and dirt marks from fastening to the interior of the mouse during use.

FIG. 1a shows a bottom plan view of a computer pointing device, in this case, a mouse 10. FIG. 1b shows a side elevational view of the mouse 10. A trackball 16 is retained in the computer pointing device with a lid or a disc plate 12. The disc plate 12 and a bottom plate 18 of the computer pointing device are provided with a suitable linkage (not shown) to connect with each other. Such a linkage most often consists of a threaded link, bayonet coupling or other suitable connection. The disc plate 12 is provided with indentations 14 which can receive a tool for removing the disc plate 12 from the bottom plate 18.

FIG. 2 shows the disc plate 12 removed from the bottom plate 18, to facilitate separation of a trackball 16 from the mouse 10. Separation is achieved by, for example, shaking the mouse 10, so the trackball 16 falls out or by any other suitable means.

An exterior mantle 18 of the trackball 16 is preferably made of a rubber-based material, although other materials may be suitable. In accordance with the present invention, the trackball 16 is covered with a fine-mesh net or fabric 20 comprising strands 22 which define interstitial spaces 24 between the strands 22. The fabric 20 is preferably made of a synthetic material, such as a nylon-based material. In the preferred embodiment, the fabric 20 is hot-pressed onto the exterior of the trackball 16.

When the fine-mesh fabric 20 is pressed onto the rubber mantle 18 of the trackball 16, the rubber mantle 18 penetrates into the interstitial spaces 24 within the fabric 20. The strands 22 of the fabric 20 and the rubber mantle 18 define recessed gaps 26 which correspond with the interstitial spaces 24 in the fabric 20. Because the mantle 18 in the recessed gaps 26 and the strands 22 of the fabric 20 have disparate elevations, the trackball 16 has a slightly ruffled surface 28.

The prominence of the strands 22 of fabric with respect to the recessed gaps 26 in the surface 28 of the trackball 16 depends on the depth at which the fabric 20 is pressed into the trackball 16 and the mantle material 18 penetrates into the interstitial spaces 24. The necessary depth depends on the application of the trackball. Some trackball applications perhaps require greater depth than others. For normal trackball functions, the fabric 20 may be hot-pressed, so that the fabric 20 and the outer surface of the ball 16 are tolerably well within the same height. Thus, the trackball 16 can actuate the direction sensors in the mouse as would a smooth trackball not covered with the fabric 20; i.e., without jerks or sudden changes.

With reference to FIG. 3, direction sensors 30, 32, usually provided in the form of rollers, engage the trackball 16. The direction sensors 30, 32 register movement of the trackball 16 and correspondingly communicate this movement to a computer which imparts movement of a cursor in the x and y directions, respectively, on the computer screen.

The mouse 10 has at least one additional positioner in the form of a roller 34. The positioner 34 engages the trackball 16 to maintain the trackball 16 in engagement with the direction sensors 30, 32.

The area of contact between the rollers 30, 32 and the trackball 16 extends over the recessed gaps 26 defined between strands 22 of fabric 20 and the rubber mantle 18. Thus, the area of contact between the rollers 30, 32 and the trackball 16 is predominantly maintained on the strands 22 of fabric 20 instead of on the mantle 18 of the trackball 16.

In accordance with the first alternative mode of the present invention, larger dirt particles fastened to rollers 30, 32 or other elements in the interior of the mouse 10 are loosened when the slightly ruffled surface 28 of the cleaning trackball 16 is rolled over them. The recessed gaps 26 in the cleaning trackball 16 collect loosened dirt with which the cleaning trackball 16 comes into contact. Because the area of contact between the mantle 18 of the cleaning trackball 16 and the rollers 30, 32 is minimal, the transfer of dirt from the recessed gaps 26 in the cleaning trackball 16 to the rollers 30, 32 is diminished. Instead, large dirt particles collected in the recessed gaps 26 on the surface of the cleaning trackball 16 are deposited on the mouse pad or other underlying surface over which the mouse 10 installed with the cleaning trackball 16 is rolled. If a cleaning trackball 10 is installed in a stationary trackball device for cleaning purposes, the collected dirt particles may be deposited on the fingers of the user or other device the user employs to rotate the trackball 16. When used in accordance with the second embodiment of the present invention, most of the large dirt particles collected from outside of the mouse 10 by the permanent trackball 16 accumulate in the recessed gaps 26. Similarly, the permanent trackball also loosens and collects large dirt particles already amassed in the interior of the mouse just as when the cleaning trackball 16 is used in accordance with the first mode of the present invention. The permanent trackball resists the transfer of larger dirt particles to the direction sensors 30, 32, because the dirt that is continuously collected on the mantle 18 of the trackball 16 in the recessed gaps 26 is not generally pressed into contact with the direction sensors 30, 32. Therefore, the trackball 16 does not press the dirt onto the direction sensors 30, 32 as do conventional trackballs.

In accordance with the first mode and the second mode of the present invention, smaller particles of dirt and skin particles besides fat, are ground away by the strands 22 of fabric 20 when the trackball 16 is rolled over such particles. Fat, however, is bound to the fabric 20 but not to the mantle 18 of the trackball as in the case of conventional trackballs.

When the fabric 20 of the trackball 16, in accordance with the present invention, periodically becomes saturated with dirt, fat etc., it must be cleaned. Cleaning the trackball 16 is described in more detail with reference to FIGS. 4a and 4b which illustrate two alternative ways of applying cleaning fluid to a trackball.

FIG. 4a shows the application of cleaning fluid to a trackball 16 which has been removed from a computer pointing device. The fluid is sprayed or dripped onto the trackball with the aid of a bottle 40. The cleaning fluid can be a type which becomes attached to the fabric 20 for more enduring use or one which is more volatile. Many suitable cleaning fluids are available in the market.

Figure 4B:
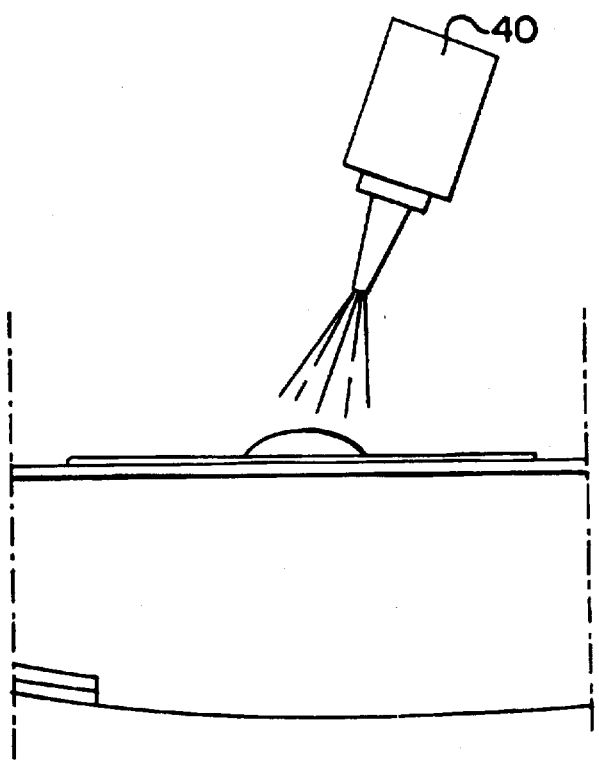
FIG. 4b illustrates the application of cleaning fluid to a trackball maintained in a computer pointing device.

Alternatively, to clean a trackball 16 without removing it from the computer pointing device, the computer pointing device can be turned upside down as shown in FIG. 4b. The fluid can be sprayed or dripped onto the trackball 16 so to contact the fabric 20. Such a procedure can be repeated more or less regularly as required.

Figure 5A:
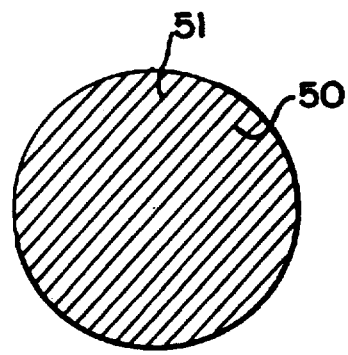
FIG. 5a shows a first embodiment of a trackball in accordance with the present invention.
Figure 5B:
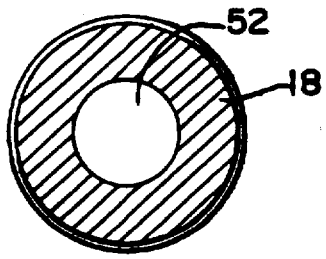
FIG. 5b shows a second embodiment of a trackball in accordance with the present invention.
Figure 5C:
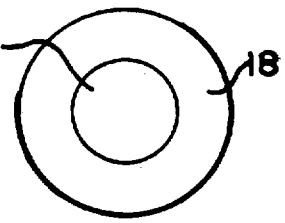
FIG. 5c shows a third embodiment of a trackball in accordance with the present invention.

FIGS. 5a, 5b and 5c show the designs for the trackball in accordance with the present invention. The fabric 20 which is applied to a trackball 16 does not have to be in the form of a net, this is illustrated by the fabric 50 has strands 51 which encircle the trackball sphere as shown in FIG. 5a.

The trackball 16 can have one of several constructions. It can be molded solidly from a synthetic or natural material such as an elastic rubber compound made for this purpose. If desired, the trackball 16 can comprise a core and a mantle 18, with the mantle 18 made of the elastic rubber compound. The core can be a sphere made of plastic or metal with a hollow center 52 with a mantle 18 comprising a rubber coating as shown in FIG. 5b. The core can also or comprise a solid plastic or metal sphere 54 with a mantle 18 applied around the core 54 as shown in FIG. 5c. The core can be provided with small projections, points, ridges, etc. (not shown) to facilitate adherence of the rubber mantle 18 to the core.

Although any suitable molding process may be employed to manufacture trackballs 16 for use in the present invention, two suitable processes are described. For trackballs 16 which are molded in one piece, without a core of metal or an inner ball of some other material, the rubber compound is laid in a hemispherical cavity in a base mold together with the fabric over and underneath the unpressed, unmolded rubber compound. In some cases, a molder cuts small pieces of a suitable rubber compound and places these in a pile in the mold.

To execute the molding process, another corresponding mold with a hemispherical cavity is placed in registry with the base mold and the two molds are connected to each other. It is important that the quantity of rubber have a larger volume than the total volume of the cavities in both molds, so the surplus rubber is forced out of the mold and neutralizes any voids which may otherwise be formed during the molding process. Subsequently, the connected molds are placed in a combined heating and pressing device. The molder sets the required parameters for the molding process which include molding time and the amount of heat and pressure to be applied to the compound. The molding process which made the first prototype in accordance with the present invention took approximately 9 minutes.

For a large-scale operation, cooperative plates of molds with several hemispherical cavities can be used for the application of the rubber and fabric 20 to produce, for example, 50–80 trackballs in one single molding phase. Different rubber compounds can require different process parameters, i.e., applied heat, pressure and molding time. The desired depth that the fabric 20 penetrates into the mantle 18 of the trackball 16 will also influence the setting of these parameters.

The molding process for trackballs with a core requires a somewhat more complicated procedure. Two rubber hemispheres with an interior hemispherical recess shaped as bowls must first be molded. A fabric element and one hemisphere are placed in a base mold which has a hemispherical cavity. Subsequently, a steel or plastic ball, for example, is placed in the interior hemispherical recess of the rubber hemisphere in the mold. The corresponding hemisphere is placed with the interior hemispherical recess over the steel or plastic ball with the second fabric element above. Finally, the actual molding process is carried out essentially as described above with respect to trackballs molded in one piece.

Innumerable known molding procedures exist and the above procedures are described only to illustrate a few suitable processes for the present invention. The above production procedures for the present invention are to be regarded as the preferred form of such procedures, but they are not intended to limit the invention as such. A series of similar production procedures are therefore possible within the framework of the wording of the enclosed patent claims.

Moreover, although the present invention has been described in conjunction with the foregoing specific embodiments, many alternatives, variations and modifications will be apparent to those with ordinary skill in the art. Those alternatives, variations and modifications are intended to fall within the scope of the appended claims.

I claim:

1. A trackball for use in a computer pointing device, said trackball comprising a mantle material, a fabric with strands defining a plurality of interstitial spaces therebetween, said fabric being arranged around said mantle material of said trackball to generate a plurality of recessed gaps defined by said mantle material and said strands of said fabric, said plurality of recessed gaps corresponding to said plurality of interstitial spaces, whereby said recessed gaps collect dirt encountered by said trackball.

2. The trackball in accordance with claim 1, wherein said trackball is a cleaning trackball structured and dimensioned to supplement an operative trackball in said computer pointing device, said cleaning trackball being temporarily placed in said computer pointing device in order to remove dirt until said cleaning trackball is removed and replaced by said operative trackball.

3. The trackball in accordance with claim 1, wherein said trackball is structured and dimensioned for permanent installation in said computer pointing device in order to continually resist said transfer of dirt to said direction sensors and to control said direction sensors.

4. The trackball in accordance with claim 1, wherein a cleaning agent is applied to said trackball which bonds to said fabric.

5. The trackball in accordance with claim 1, wherein said fabric is made of a synthetic material.

6. The trackball in accordance with claim 1, wherein said trackball is made of a rubbery material.

7. The trackball in accordance with claim 1, wherein a core of said trackball is made of a different material than said mantle material.

8. The trackball in accordance with claim 7, wherein said core of said trackball comprises a ball of plastic.

9. The trackball in accordance with claim 7, wherein said core of said trackball comprises a ball of metal.

10. The trackball in accordance with claim 8, wherein said mantle material of said trackball consists of a rubber material.

11. The trackball in accordance with claim 1, wherein said mantle material penetrates into said interstitial spaces of said fabric to provide a depth of said recessed gaps.

12. The trackball in accordance with claim 1, wherein said fabric is hot-pressed onto said mantle material of said trackball.

13. A computer pointing device for communicating movement to a cursor associated with a computer screen comprising a casing, a trackball, direction sensors engaging said trackball for registering movement of said trackball, and a plate for retaining said trackball in said casing, said trackball comprising a mantle material, a fabric with strands defining a plurality of interstitial spaces therebetween, said fabric being arranged around said mantle material of said trackball to generate a plurality of recessed gaps defined by said mantle material and said strands of said fabric, said plurality of recessed gaps corresponding to said plurality of interstitial spaces, whereby said recessed gaps collect dirt encountered by said trackball.

14. The computer pointing device in accordance with claim 13, wherein said trackball is a cleaning trackball structured and dimensioned to supplement an operative trackball in said computer pointing device, said cleaning trackball being temporarily placed in said computer pointing device in order to remove dirt until said cleaning trackball is removed and replaced by said operative trackball.

15. The computer pointing device in accordance with claim 13, wherein said trackball is structured and dimensioned for permanent installation in said computer pointing device in order to continually resist the transfer of dirt to said direction sensors and to control said direction sensors.

16. The computer pointing device in accordance with claim 13, wherein a cleaning agent is applied to said trackball which bonds to said fabric.

17. The computer pointing device in accordance with claim 13, wherein said fabric is made of a synthetic material.

18. The trackball in accordance with claim 13, wherein said trackball is made of a rubbery material.

* * * * *